(12) United States Patent
Hong et al.

(10) Patent No.: US 11,278,178 B2
(45) Date of Patent: *Mar. 22, 2022

(54) DISHWASHER INCLUDING WATER GUIDE WITH WATER PIPE CONNECTOR

(71) Applicant: LG Electronics Inc., Seoul (KR)

(72) Inventors: Wook Hong, Seoul (KR); Ganghyun Lee, Seoul (KR); Hyungman Park, Seoul (KR)

(73) Assignee: LG Electronics Inc., Seoul (KR)

( * ) Notice: Subject to any disclaimer, the term of this patent is extended or adjusted under 35 U.S.C. 154(b) by 115 days.

This patent is subject to a terminal disclaimer.

(21) Appl. No.: 16/238,718

(22) Filed: Jan. 3, 2019

(65) Prior Publication Data

US 2019/0200838 A1    Jul. 4, 2019

(30) Foreign Application Priority Data

Jan. 4, 2018  (KR) .................. 10-2018-0001095

(51) Int. Cl.
*A47L 15/42* (2006.01)
*A47L 15/16* (2006.01)
(Continued)

(52) U.S. Cl.
CPC .......... *A47L 15/4219* (2013.01); *A47L 15/06* (2013.01); *A47L 15/16* (2013.01); *A47L 15/22* (2013.01); *A47L 15/428* (2013.01); *A47L 15/4225* (2013.01); *A47L 2501/03* (2013.01); *A47L 2501/20* (2013.01)

(58) Field of Classification Search
CPC .... A47L 15/22; A47L 15/4225; A47L 15/428; A47L 15/16; A47L 15/4219; A47L 15/4214; A47L 15/00–508
See application file for complete search history.

(56) References Cited

U.S. PATENT DOCUMENTS

2004/0069332 A1* 4/2004 LeBaron ................. A47L 15/23
                                                                134/179
2005/0241680 A1   11/2005 Noh
(Continued)

FOREIGN PATENT DOCUMENTS

CN    203447254 U  *  2/2014  ......... A47L 15/4219
DE       19959355        7/2001
(Continued)

OTHER PUBLICATIONS

AppliancePartsPro, How to: GE Spray Arm Water Supply Tube WD12X10113, Jul. 25, 2016, YouTube, https://www.youtube.com/watch?v=KS06gkv7ajg (Year: 2016).*

(Continued)

*Primary Examiner* — Michael E Barr
*Assistant Examiner* — Omair Chaudhri
(74) *Attorney, Agent, or Firm* — Fish & Richardson P.C.

(57) ABSTRACT

The present invention relates to a dishwasher and a manufacturing method thereof.
The dishwasher according to an embodiment of the present invention includes a water guide extending upward from a sump and supplying washing water to an upper nozzle and a top nozzle, and the upper pipe and the top pipe are separately provided to the water guide, so pressure of the washing water applied to the upper pipe and the top pipe can be reduced.

16 Claims, 20 Drawing Sheets

(51) Int. Cl.
*A47L 15/06* (2006.01)
*A47L 15/22* (2006.01)

(56) References Cited

U.S. PATENT DOCUMENTS

| | | | | |
|---|---|---|---|---|
| 2008/0202565 | A1* | 8/2008 | Tameishi | A47L 15/0078 134/95.3 |
| 2012/0285490 | A1* | 11/2012 | Blanchard | A47L 15/0018 134/25.2 |
| 2013/0092194 | A1* | 4/2013 | Carlson | A47L 15/4219 134/25.2 |
| 2014/0299683 | A1* | 10/2014 | Zhao | A47L 15/23 239/601 |
| 2016/0000295 | A1* | 1/2016 | Cavallaro | A47L 15/4282 134/199 |
| 2017/0181599 | A1* | 6/2017 | Choi | A47L 15/4217 |
| 2019/0177902 | A1* | 6/2019 | Rupnow | D06F 39/083 |

FOREIGN PATENT DOCUMENTS

| | | | | |
|---|---|---|---|---|
| DE | 102006061149 | | 6/2008 | |
| EP | 0829221 | B1 * | 4/2003 | A47L 15/508 |
| EP | 1120078 | B1 * | 1/2010 | A47L 15/4219 |
| EP | 3040011 | | 7/2016 | |
| EP | 3040011 | A1 * | 7/2016 | A47L 15/23 |
| EP | 3181033 | | 6/2017 | |
| EP | 2441369 | B1 * | 1/2020 | A47L 15/23 |
| KR | 20060064576 | | 6/2006 | |
| KR | 20060085974 | | 7/2006 | |
| KR | 10-2007-0056281 | | 6/2007 | |
| KR | 20100113724 | | 10/2010 | |
| KR | 101213800 | | 12/2012 | |
| KR | 20050105706 | | 11/2015 | |

OTHER PUBLICATIONS

"AALCO, Stainless Steel—General Information—Alloying Elements in Stainless Steel, 2016, https://web.archive.org/web/20160314080700/http://www.aalco.co.uk/datasheets/Stainless-Steel_Alloying-Elements-in-Stainless-Steel_98.ashx" (Year: 2016).*
No Author, "WD12X10113 GE Dishwasher Upper Wash Arm Water Supply Tube", 2021, Walmart, https://www.walmart.com/ip/WD12X10113-GE-Dishwasher-Upper-Wash-Arm-Water-Supply-Tube/258473998 (Year: 2021).*
Extended European Search Report in European Application No. 19150204.6, dated May 17, 2019, 8 pages.
Office Action in Korean Appln. No. 10-2018-0001095, dated Nov. 26, 2021, 16 pages (with English translation).

* cited by examiner

DISHWASHER INCLUDING WATER GUIDE WITH WATER PIPE CONNECTOR

CROSS REFERENCE TO RELATED APPLICATION

The present application claims priority to Korean Patent Application No. 10-2018-0001095, filed on Jan. 4, 2018, the entire contents of which is incorporated herein for all purposes by this reference.

BACKGROUND OF THE INVENTION

Field of the Invention

The present invention relates to a dishwasher.

Description of the Related Art

In general, a dishwasher is a machine that washes dishes stained with food or dirt by spraying washing wafers to the dishes. A tub having a washing space may be disposed in dishwashers and a rack assembly for holding dishes may be disposed in the tub. The rack assembly may be provided to be able to be drawn out of the tub.

Dishwashers may further include a sump that stores washing water, nozzles that spray the water stored in the sump to dishes, and a water guide that has pipes extending from the sump to the nozzles to guide the washing water. The pipes include an upper pipe extending from the sump to a substantially vertical center portion of the tub and a top pipe extending to the upper space of the tub.

In relation to dishwashers in the related art, the applicant(s) has applied for a patent as follows.

1. Publication No. (Publication Date): 10-2007-0056281 (Apr. 8, 2013)
2. Title of Invention: Dishwasher and Water Guide of Dishwasher According to this dishwasher of the related art, the following problems may occur.

First, pipes of the water guide are made of plastic, so when high-temperature washing water or steam flows through the pipes, aging occurs in the pipes due to heat, whereby the pipes are corroded or broken.

Second, an upper pipe and a top pipe of the pipes are integrally formed, so the amount (pressure) of water flowing through the pipes is relatively high, and accordingly, there is some possibility that the pipes are damaged.

Third, stress concentration occurs when bending portions are formed on the plastic pipes, so the bending portions are corroded or broken.

Fourth, high pumping pressure is applied to a connector for fixing a pipe to a sump, so water leaks at the connector or the connector is separated.

SUMMARY OF THE INVENTION

The present invention has been made in an effort to solve the problems and an object of the present invention is to provide a water guide of a dishwasher in which pipes of the water guide are made of a stainless material to prevent corrosion. In particular, the object is to provide a dishwasher in which ductility and hardness of the pipes can be improved because the pipes are made of ductile stainless steel pipes.

Another object of the present invention is to provide a dishwasher that can reduce pressure of washing water that is applied to an upper pipe or a top pipe by separately providing the upper pipe and the top pipe such that washing water discharged from a sump separately flows to an upper nozzle and a top nozzle.

Another object of the present invention is to provide a dishwasher in which the upper pipe and the top pipe are configured as polygonal pipes, thereby being able to prevent interference with the upper pipe and the top pipe by surrounding components and allow the pipes to be easily supported by an upper connector.

Another object of the present invention is to provide a dishwasher that can easily achieve a bent shape of a water guide and can prevent corrosion due to stress concentration at a bending portion by forming the bending portion through processing of an upper pipe and a top pipe made of a stainless material.

Another object of the present invention is to provide a dishwasher that can prevent separation of a pipe from a connector and can prevent leakage of washing water at the connector, through a lower connector connecting the pipes and a sump and a clamp coupled to the lower connector.

In particular, an object of the present invention is to provide a dishwasher that can prevent the front portion of the lower connector from being separated from the sump by making the hardness of a front portion connected to the sump of the lower connector relatively great.

Another object of the present invention is to provide a dishwasher that can prevent leakage of water at a rear portion by bringing the rear portion of a lower connector in close contact with a pipe by making the rear portion connected to the pipe of the lower connector relatively small.

Another object of the present invention is to provide a dishwasher that can prevent leakage of water at a rear portion of the lower connector by providing that can tighten the rear portion.

The dishwasher according to an embodiment of the present invention includes a water guide extending upward from a sump and supplying washing water to an upper nozzle and a top nozzle, and the upper pipe and the top pipe are separately provided to the water guide, so pressure of the washing water applied to the upper pipe and the top pipe can be reduced.

The upper pipe may communicate with a first outlet of the sump and the top pipe may communicate with a second outlet of the sump.

An upper connector supporting the upper pipe and the top pipe may be further included.

The upper connector includes a connector channel through which washing water supplied through the upper pipe flows.

The upper connector may further include: a pipe coupling portion to which the upper pipe is coupled; and a pipe inserting portion in which the top pipe is seated, thereby being able to stably supporting the upper pipe and the top pipe.

The upper pipe may be forcibly fitted in the pipe coupling portion, thereby being able to prevent leakage of washing water.

The upper pipe includes: an upper inlet into which the washing water stored in the sump is introduced; and an upper outlet that is disposed in the pipe coupling portion and through which washing water is discharged to the connector channel.

A hook formed on a lateral side of the upper connector and a hook insert formed at the bracket and in which the hook is fitted are further included.

The bracket is bent to surround at least a portion of the rear portion of the upper connector and at least a portion of both lateral sides of the upper connector, so it can be stably supported on the upper connector.

A connector outlet that is disposed at the upper connector to discharge the washing water in the connector channel is further included, and the connector outlet extends to be round from the connector channel.

At least one of the upper pipe and the top pipe is made of a stainless material.

At least one of the upper pipe and the top pipe is a stainless steel pipe including a stainless material and impurities consisting of carbon, manganese, chromium, nickel, and copper, so corrosion resistance against stress of washing water can be improved.

An upper bending portion that is provided at the upper pipe and changes the flow direction of the washing water; and first and second top bending portions that are provided at the top pipe and changes the flow direction of the washing water are further included, so flow of washing water can be easily guided.

The upper pipe and the top pipe are made of a stainless material, so processibility of the pipes is excellent and stress corrosion can be prevented.

At least one of the upper pipe and the top pipe is a polygonal pipe, so usability of the space for installing the upper pipe and the top pipe can be improved.

A method of controlling a dishwasher according to another aspect includes: processing a circular pipe using a raw material plate including a stainless material and at least copper; manufacturing a rectangular pipe by drawing the processed circular pipe; and manufacturing the upper pipe and the top pipe having a bent shape by bending the rectangular pipe.

The bending may be performed using a mandrel.

According to the present invention described above, the pipes of the water guide, that is, the upper pipe and the top pipe are made of a stainless steel, so strength and hardness can be reinforced and corrosion due to thermal deterioration can be prevented.

In particular, a ductile stainless steel pipe, for example, an austenite type stainless steel pipe is applied to the pipes, so it is possible to secure high level of ductility in comparison to normal stainless steel pipes, and accordingly, bending processing is easy. The pipes can secure ductility and can have high strength and hardness, so a pressure resistance ability is excellent.

The upper pipe and the top pipe are separately provided and washing water discharged from the sump separately flows to an upper nozzle and a top nozzle, so pressure of washing water applied to the upper pipe or the top pipe can be reduced. Accordingly, stress corrosion of the pipes due to water pressure can be prevented.

The upper pipe and the top pipe are polygonal pipes, so interference with the upper pipe and the top pipe by surrounding components can be prevented. The polygonal outer surfaces of the upper pipe and the top pipe can be easily supported on an upper connector.

It is possible to easily achieve a bent shape of a water guide and can prevent corrosion due to stress concentration at a bending portion by forming the bending portion through processing of an upper pipe and a top pipe made of a stainless material.

It is possible to prevent separation of a pipe from a connector and can prevent leakage of washing water at the connector, through a lower connector connecting the pipes and a sump and a clamp coupled to the lower connector.

In particular, it is possible to prevent the front portion of the lower connector from being separated from the sump by making the hardness of a front portion connected to the sump of the lower connector relatively great.

It is possible to prevent leakage of water at a rear portion by bringing the rear portion of a lower connector in close contact with a pipe by making the rear portion connected to the pipe of the lower connector relatively small.

The clamp is provided in a type of clip that can tighten a rear portion of the lower connector, so leakage of water at the rear portion can be prevented.

A polygonal pipe is manufactured through drawing after a circular pipe is formed using a stainless material and a bending portion of a water guide can be achieved through a bending process of the manufactured polygonal pipe, so elongation and processibility of the pipe can be improved.

Pipe caving at the bending portion, that is, the phenomenon that the pipe is excessively recessed at the bending portion can be prevented, so stress corrosion can be reduced.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, detailed embodiments of the present invention will be described with reference to the drawings. However, the spirit of the present invention is not limited to the proposed embodiments and other embodiments may be easily proposed by those skilled in the art without departing from the scope of the present invention.

Figure 1:
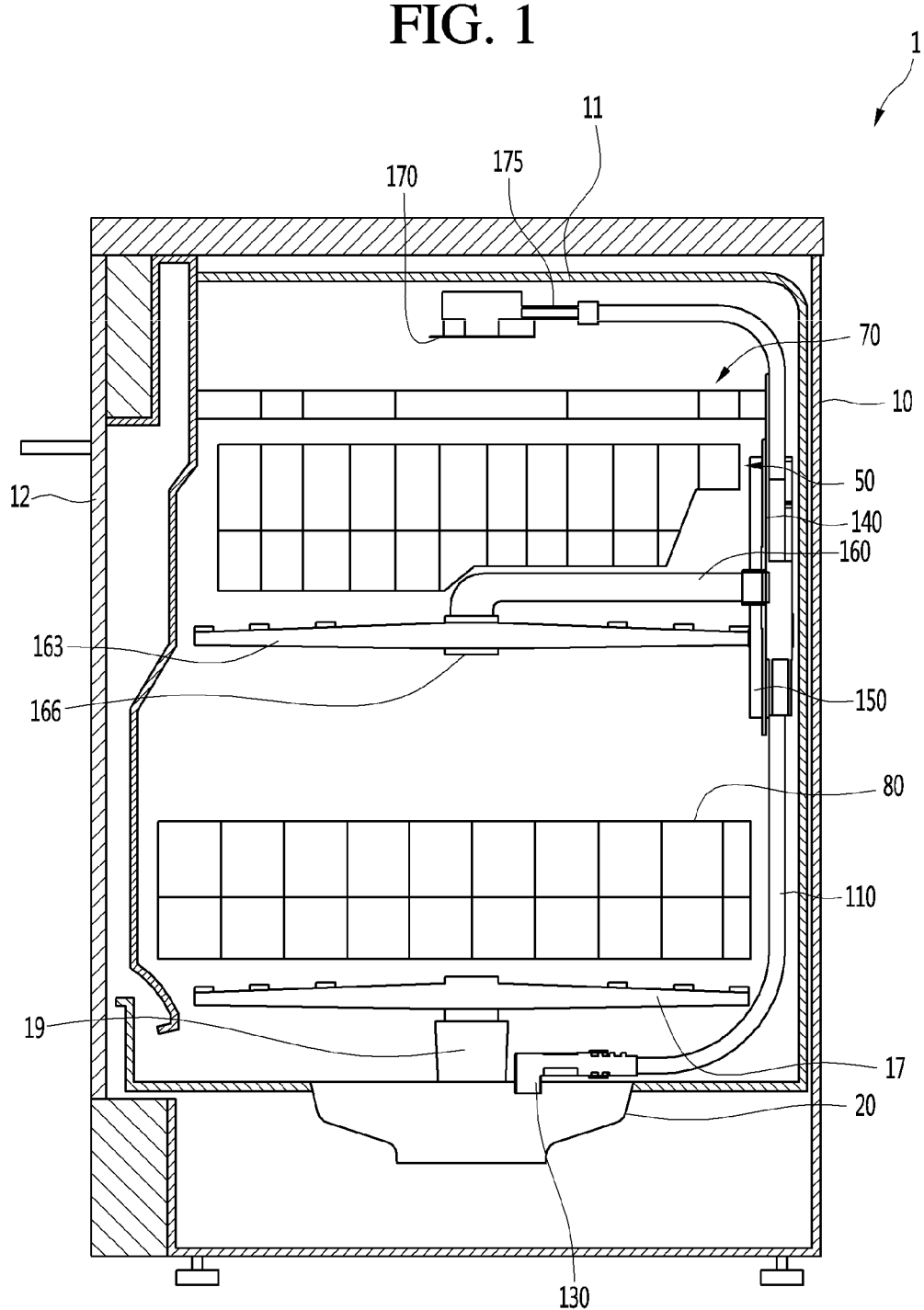
FIG. 1 is a cross-sectional view of a dish washer according to an embodiment of the present invention.
Figure 2:
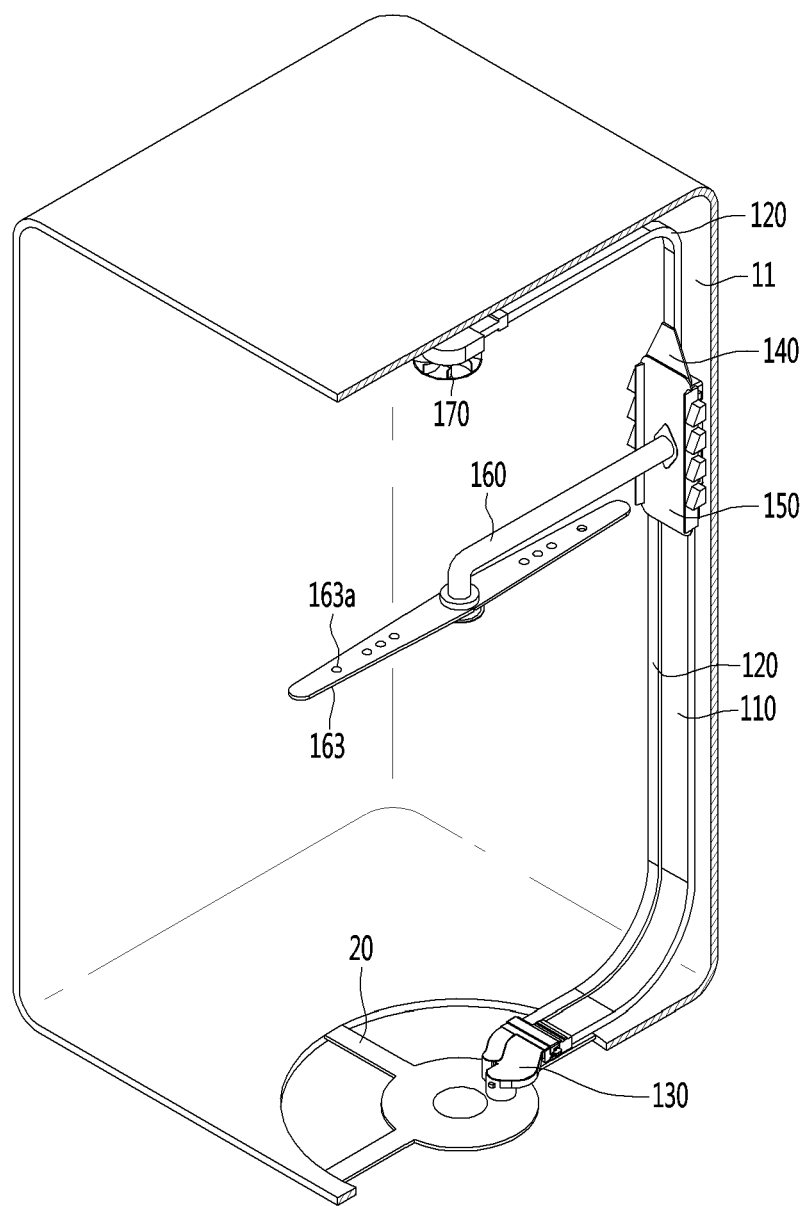
FIG. 2 is a view showing a water guide disposed in the dishwasher according to an embodiment of the present invention.

FIG. 1 is a cross-sectional view of a dish washer according to an embodiment of the present invention and FIG. 2 is a view showing a water guide disposed in the dishwasher according to an embodiment of the present invention.

Referring to FIGS. 1 and 2, a dishwasher 1 according to an embodiment of the present invention includes a case 10 forming the external appearance, a tub 11 disposed in the case 10 and forming a washing container, a door disposed on the front of the tub 11 and opening/closing the washing container, and a sump 20 disposed on the bottom of the tub 11 and storing washing water.

A plurality of racks 50, 70, and 80 for holding dishes is provided in the tub 11. The racks 50, 70, and 80 can be drawn forward out of the tub 11 by being guided by guide rails (not shown) disposed on the inner sides of the tub 11. The racks 50, 70, and 80 include a first rack 50 disposed at an upper portion of the tub 11, a second rack 70 disposed over the first rack 50, and a third rack 80 disposed under the first rack 50.

A lower nozzle 17, an upper nozzle 163, and a top nozzle 170 that spray washing water supplied from the sump 20 into the washing container are disposed over the sump 20.

In detail, the lower nozzle 17 is coupled to the top of the sump 20 and sprays washing water to the lower portion of the washing container, and the sprayed washing water is sprayed toward dishes in the third rack 80. A lower nozzle coupler 19 coupled to the lower nozzle 17 is provided at the sump 20.

The upper nozzle 163 is disposed at the center portion of the washing container and sprays washing water toward the first rack 50 or the second rack 70 and the top nozzle 170 is disposed close to the ceiling of the tub 11 and sprays down washing water toward the first to third racks 50, 70, and 80.

A water guide 100 that allows flow of washing water supplied to the sump 10 from a washing pump (not shown) is disposed in the tub 11. The water guide 100 is connected to the sump 20, extends rearward, and is bent around the rear portion of the tub 11 and then extends upward.

The water guide 100 includes an upper pipe 110 that guides washing water stored in the sump 200 to the upper nozzle 163 and a top pipe 120 that guides washing water to the top nozzle 170. Washing water flowing through the upper pipe 110 and the top pipe 120 can be sprayed toward the first rack 50 or the second rack 70 through the top nozzle 170 and the upper nozzle 163. The upper pipe 110 and the top pipe 120 may be referred in combination as to a "washing water pipe".

The top pipe 120 may bend to the upper portion of the tub 11 and then may bend and extend forward from the upper portion of the tub 11. A top connector 175 connected to the top nozzle 170 may be disposed at the upper portion of the top pipe 120.

A supply pipe 160 is connected to a substantially vertical middle portion of the water guide 100. The supply pipe 160 may extend forward from the water guide 100 and may be connected to the upper nozzle 163. In detail, a nozzle holder 166 may be coupled to the supply pipe 160 and the upper nozzle 163 may be coupled to the nozzle holder 166.

The upper nozzle 163 includes nozzle holes 163a for spraying washing water supplied to the upper nozzle 163 downward and upward from the upper nozzle 163. Several nozzle holes 163 are formed through the top and the bottom of the upper nozzle 163 and washing water can be sprayed toward the first rack 50 or the second rack 70 through the nozzle holes 163a.

The water guide 100 further includes a holder 150 supporting the supply pipe 160. The holder 150 may be disposed at a substantially middle portion of the water guide 100 and may be coupled to the supply pipe 160.

The water guide 100 further includes an upper connector 140 coupled to the rear portion of the holder 150 and supporting the upper pipe 110 and the top pipe 120, which will be described below.

The water guide 100 further includes a lower connector 130 disposed at the lower portion of the water guide 100 and coupled to the sump. The lower connector 130 may be understood as a part for connecting the upper pipe 110 and the top pipe 120 to the sump 20.

The configuration of the water guide 100 is described hereafter in detail with reference to the drawings.

Figure 3:
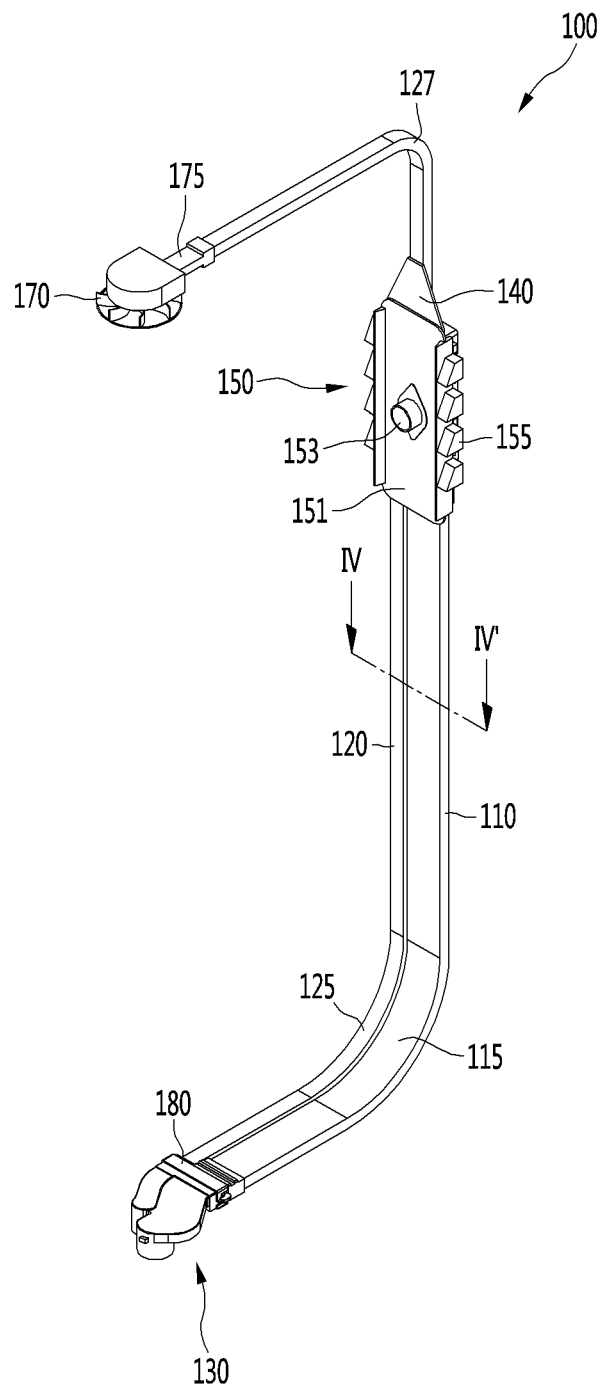
FIG. 3 is a perspective view showing the configuration of the water guide according to an embodiment of the present invention.
Figure 4:
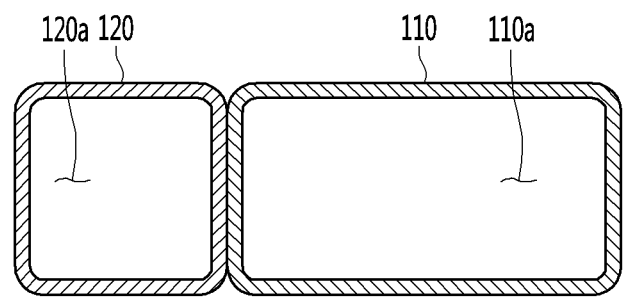
FIG. 4 is a cross-sectional view taken along line IV-IV' of FIG. 3.
Figure 5:
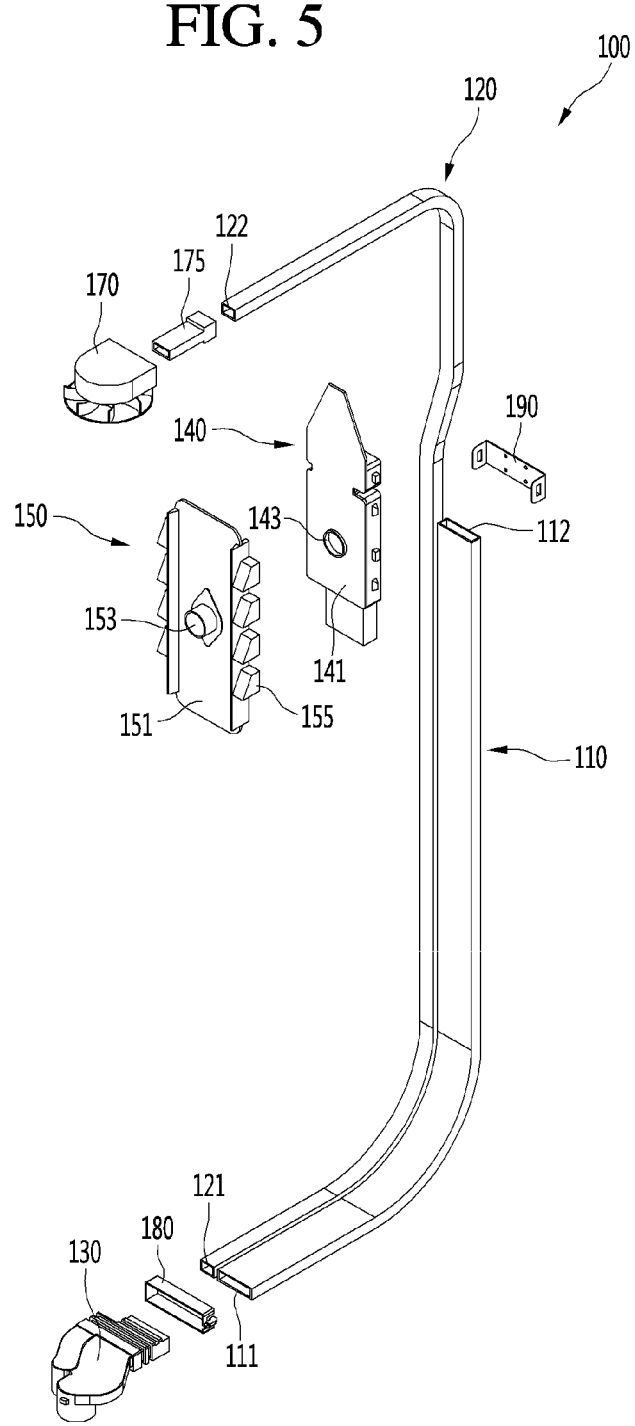
FIG. 5 is an exploded perspective view showing the configuration of the water guide according to an embodiment of the present invention.

FIG. 3 is a perspective view showing the configuration of the water guide according to an embodiment of the present invention, FIG. 4 is a cross-sectional view taken along line IV-IV' of FIG. 3, and FIG. 5 is an exploded perspective view showing the configuration of the water guide according to an embodiment of the present invention.

Referring to FIGS. 3 to 5, the water guide 100 according to an embodiment of the present invention includes a plurality of pipes 110 and 120 connected to the sump 20 to guide washing water. The pipes 110 and 120 includes an upper pipe 110 extending from the sump 20 to a height around the center portion of the washing container and a top pipe 120 extending from the sump 20 to a height around the ceiling of the washing container.

The upper pipe 110 and the top pipe 120 may be arranged in parallel close to each other up to the height around the center portion of the washing container. The top pipe 120 may further extend up to a height around the ceiling from the center portion of the washing container.

The upper pipe 110 and the top pipe 120 may have bending shapes.

In detail, the upper pipe 110 extends rearward from the top of the sup 20, bends upward around the rear portion of the washing container, and then extends up to a height around the center portion of the washing container. The upper pipe 110 includes a first up-bending portion 115 disposed around the lower rear portion of the washing container. The bending angle of the first up-bending portion 115 is about 90 degrees. The upper pipe 110 can have an L-shape by the first up-bending portion 115.

The top pipe 120 extends rearward from the top of the sup 20, bends upward around the rear portion of the washing container, and then extends up to a height around the ceiling of the washing container. The top pipe 110 includes a plurality of bending portions.

In detail, the bending portions include a first top bending portion 125 disposed around the lower rear portion of the washing container and a second top bending portion 127 disposed around the upper rear portion of the washing container. The bending angles of the first and second top bending portions 115 are about 90 degrees. The top pipe 120 can have a U-shape by the first and second top bending portions 125 and 127.

The upper pipe 110 and the top pipe 120 each may have a polygonal pipe shape. For example, the upper pipe 110 and the top pipe 120 may have a rectangular pipe shape. The polygonal pipe has the advantage that an available flow cross-section can be large relative to the installation volume of the pipe, as compared with common circular pipes.

An upper channel 110a through which washing water flows is formed in the upper pipe 110. A top channel 120a through which washing water flows is formed in the top pipe 120. The upper channel 110a and the top channel 120a each may form a substantially rectangular cross-section.

The upper channel 110a may be formed greater in size than the top channel 120a. Accordingly, the amount of washing water that is supplied to the upper nozzle 163 through the upper channel 110a may be greater than the amount of washing water that is supplied to the top nozzle 170 through the top channel 120a. Accordingly, the amount of washing water that is sprayed from the upper nozzle 163 may be greater than the amount of washing water that is sprayed from the top nozzle 170.

The upper pipe 110 includes an upper inlet 111 into which washing water supplied from the sump 20 is introduced and an upper outlet 112 through which washing water flowing through the upper pipe 110 is discharged to the upper connector 140. The upper inlet 111 may form an end of the upper pipe 110 and the upper outlet 112 may form the other end of the upper pipe 110.

The top pipe 120 includes a top inlet 121 into which washing water supplied from the sump 20 is introduced and a top outlet 122 through which washing water flowing through the top pipe 120 is discharged to the top connector 175. The top inlet 121 may form an end of the top pipe 120 and the top outlet 122 may form the other end of the top pipe 120.

The upper pipe 110 and the top pipe 120 may be stainless steel pipes. For example, a ductile stainless steel pipe having high strength and processibility may be included in the stainless steel pipes. In particular, the ductile stainless steel has a high flexibility, so it may mean that bending processibility of the pipe is very high. The ductile stainless steel pipe may be made of a material including a stainless material and impurities including at least copper (Cu).

The composition of the ductile stainless steel pipe is described hereafter. It should be noted that the ratios of composition to be described hereafter are expressed in weight percent (wt %).

1. Composition of Stainless Steel (1) Carbon (C): 0.3% or less

The stainless steel for forming the water guide 100 and the pipes 110 and 120 contains carbon (C) and chromium (Cr). Carbon is extracted as chromium carbide by reacting with chromium, in which exhaustion of chromium at or around grain boundaries causes corrosion. Accordingly, it is preferable to maintain the content of carbon at a low level.

Carbon is an element that increases creep strength by bonding with another element, and when the content of carbon exceeds 0.03%, ductile is deteriorated. Accordingly, the content of carbon is set at 0.03% or less in the present invention.

(2) Silicon (Si): more than 0 to 1.7% or less

Austenite has low yield strength as compared with ferrite or martensite. Accordingly, it is preferable that the matrix structure of the stainless steel is austenite in order that the ductile stainless steel of the present invention has flexibility (or degree of freedom of bending) at a lever similar to or equal to that of copper.

However, because silicon is an element that forms ferrite, the higher the content of silicon, the higher the ratio of ferrite in a matrix structure, which increases the stability of ferrite. It is preferable to maintain the content of silicon as low as possible, but it is impossible to completely preventing silicon from being contained as an impurity in a manufacturing process.

When the content of silicon exceeds 1.7%, it is difficult to give a required level of ductility to stainless steel and accordingly it becomes difficult to secure sufficient processibility. Accordingly, the content of silicon that is contained in the stainless steel according to an embodiment of the present invention is set at 1.7% or less.

(3) Manganese (Mn): 1.5~3.5%

Manganese suppresses a phase change of the matrix structure of stainless steel into a martensite type and contributes to stabilization by increasing an austenite region. If the content of manganese is less than 1.5%, a sufficient effect of the phase change suppression by manganese cannot be expected. Accordingly, the lower limit of the content of manganese is set at 1.5% to obtain a sufficient effect of the phase change suppression by manganese.

However, the higher the content of manganese, the higher the yield strength of stainless steel, which decreases ductility of the stainless steel. Accordingly, the upper limit of the content of manganese is set at 3.5%.

(4) Chromium (Cr): 15~18%

Chromium is an element that improves corrosion initiation resistance of stainless steel. Corrosion initiation means occurrence of initial corrosion without a base material corroded and corrosion initiation resistance means a property that suppresses initial corrosion of a base material. The corrosion initiation resistance can be construed as the same meaning as corrosion resistance.

When the content of chromium is less than 15.0%, the stainless steel cannot have sufficient corrosion initiation resistance (or corrosion resistance), so the lower limit of the content of chromium is set at 15.0% in the present invention.

However, when the content of chromium is too high, the phase changes into ferrite in a room temperature, which reduces ductility. Further, particularly, stability of austenite is removed and the structure become brittle, which decreases strength. Therefore, the upper limit of the content of chromium is set at 18.0% in the present invention.

(5) Nickel (Ni): 7.0~9.0%

Nickel has properties that improve corrosion growth resistance of stainless steel and stabilizes austenite. Corrosion growth means that corrosion generated in a base material grows while spreading wide and corrosion growth resistance means suppression of growth of corrosion.

When the content of nickel is less than 7.0%, the stainless steel cannot have sufficient corrosion growth resistance, so the lower limit of the content of nickel is set at 7.0% in the present invention. When the content of nickel is too high, the strength and hardness of the stainless steel are increased, so it becomes difficult to secure sufficient processibility of the stainless steel. Further, the costs are increased, which is economically disadvantageous. Therefore, the upper limit of the content of nickel is set at 9.0% in the present invention.

(6) Copper (Cu): 1.0~4.0% Copper increases ductility of stainless steel by suppressing a phase change of the matrix structure of the stainless steel into martensite. When the content of copper is less than 1.0%, a sufficient effect of the phase change suppression by copper cannot be expected. Accordingly, the lower limit of the content of copper is set at 1.0% to obtain a sufficient effect of the phase change suppression by copper in the present invention. In particular, the content of copper may be 1.0% or more to give a required level of flexibility to the stainless steel.

The higher the content of copper, the more the effect of phase change suppression of a matrix structure, but the increasing amount gradually decreases. When the content of copper is too high over 4~45%, the effect is saturated and generation of martensite is promoted, so it is not advantageous. Further, since copper is an expensive element, it influences economic efficiency. Therefore, the upper limit of the content of copper is set at 4.0% to maintain the effect of phase change suppression by copper under the saturation level and to secure economical efficiency.

(7) Molybdenum (Mo): 0.03% or less
(8) Phosphorus (P): 0.04% or less
(9) Sulfur (S): 0.04% or less
(10) Nitrogen (N): 0.03% or less Molybdenum, phosphorous, sulfur, and nitrogen, which are elements already contained in semi-finished steel products, harden stainless steel, so it is preferable to maintain the content of them as low as possible.

2. Matrix Structure of Stainless Steel

Stainless steel, depending on the metal structure (or matrix structure), are classified into austenite type stainless steel having chromium (18%) and nickel (8%) as main components, ferrite type stainless steel having chromium (18%) as a main component, and martensite type stainless steel having chromium (8%) as a main component.

Austenite type stainless steel having excellent corrosion resistance against salt or acid and high ductility, so the ductile stainless steel of the present invention may be stainless steel of which the matrix structure is an austenite type.

Further, the austenite structure has lower yield strength and hardness than those of the ferrite structure or the martensite structure. Furthermore, when the grain sizes are grown under the same condition, the average grain size of austenite is largest, which is advantageous in increasing ductility.

It is preferable that the matrix structure of stainless steel is formed by only an austenite structure to increase ductility of stainless steel. However, it is very difficult to control the matrix structure of stainless steel within only austenite, so other matrix structures are unavoidably included.

In detail, another matrix structure that influences ductility of austenite type stainless steel is δ-ferrite that is produced in a heat treatment process. That is, the greater the content of δ-ferrite, the higher the hardness of stainless steel, but the lower the ductility.

It is preferable for stainless steel to have an austenite matrix structure of over 90%, preferably, over 99% and a δ-ferrite matrix structure of 1% with respect to the grain area. Accordingly, it may be possible to reduce the amount of δ-ferrite contained in austenite type stainless steel as one of methods that increase ductility of stainless steel.

Even though ductility stainless steel according to an embodiment of the present invention has a δ-ferrite matrix structure of 1% or less, it is advantageous for increase of ductility that the δ-ferrite is locally concentrated in specific grains rather than uniformly distributed throughout the entire grains.

3. Average Grain Size (Average Diameter) of Stainless Steel

The average grain size of stainless steel may depend on the composition and/or a heat treatment condition. The average grain size of stainless steel influences the strength and hardness of the stainless steel. For example, the smaller the average grain size, the higher the strength and hardness of stainless steel, and the greater the average grain size, the lower the strength and hardness of stainless steel.

Ductile stainless steel according to an embodiment of the present invention may be given high flexibility by adjusting the content of copper and the grain area of δ-ferrite. To this end, the average grain size of the stainless steel is limited within 30~60 μm. The average grain size of a common austenite structure is smaller than 30 μm. Accordingly, it is required to grow the average grain size over 30 μm through a manufacturing process and heat treatment.

According to the standards by American Society for Testing and Materials (ASTM), the average grain size of 30~60 μm corresponds to grain size Nos. 5.0~7.0. However, the average grain size smaller than 30 μm corresponds to a grain size No. 7.5 or more by ASTM.

The water guide 100 further includes the lower connector 130 connecting the upper pipe 110 and the top pipe 120 to the sump 20. The lower connector 130 may be made of rubber.

For example, the lower connector 130 may be made of an EPDM material (EPDM rubber or ethylene propylene diene M-class rubber). The lower connector 130 may be configured such that the hardness of the front portion connected to the sump 20 and the hardness of the rear portion connected with the pipes 110 and 120 have different values. To this end, the lower connector 130 may be manufactured by multiple injection molding. This will be described below.

The water guide 100 further includes a clamp 180 coupled to the lower connector 130. It is possible to prevent the pipes 110 and 120 from separating from the lower connector 130 by tightening the clamp 180.

The water guide 100 further includes the upper connector 140 supporting the upper pipe 110 and the top pipe 120. The upper connector 140 may be disposed at the height of the center portion of the washing container.

In detail, the upper connector 140 includes a connector body 141 to which the upper pipe 110 is coupled. A connector outlet 143 for discharging washing water supplied from the upper pipe 110 may be disposed on the front surface of the connector body 141.

The water guide 100 further includes the holder 150 disposed ahead of the upper connector 140 and supporting the supply pipe 160. The holder 150 includes a holder body 151 coupled to the upper connector 140 and having a pipe communicating portion 153 communicating with the connector outlet 143. The supply pipe 160 can be coupled to the pipe communicating portion 153.

The holder 150 includes a rack supporting portion 155 disposed on both sides of the holder body 151 and supporting the first rack 50. The rack supporting portion 155 may include a plurality of rack supporting portions vertically spaced apart from one another. The first rack 50 can be installed at a predetermined height by being supported by one of the rack supporting portions.

The water guide 100 further includes a bracket 190 for fixing the top pipe 120 to the upper connector 140. The top pipe 120 can be seated on the upper connector 140 and the bracket 190 is coupled to the outer side of the top pipe 120, thereby being able to keep the top pipe 120 in close contact with the upper connector 140.

Figure 6:
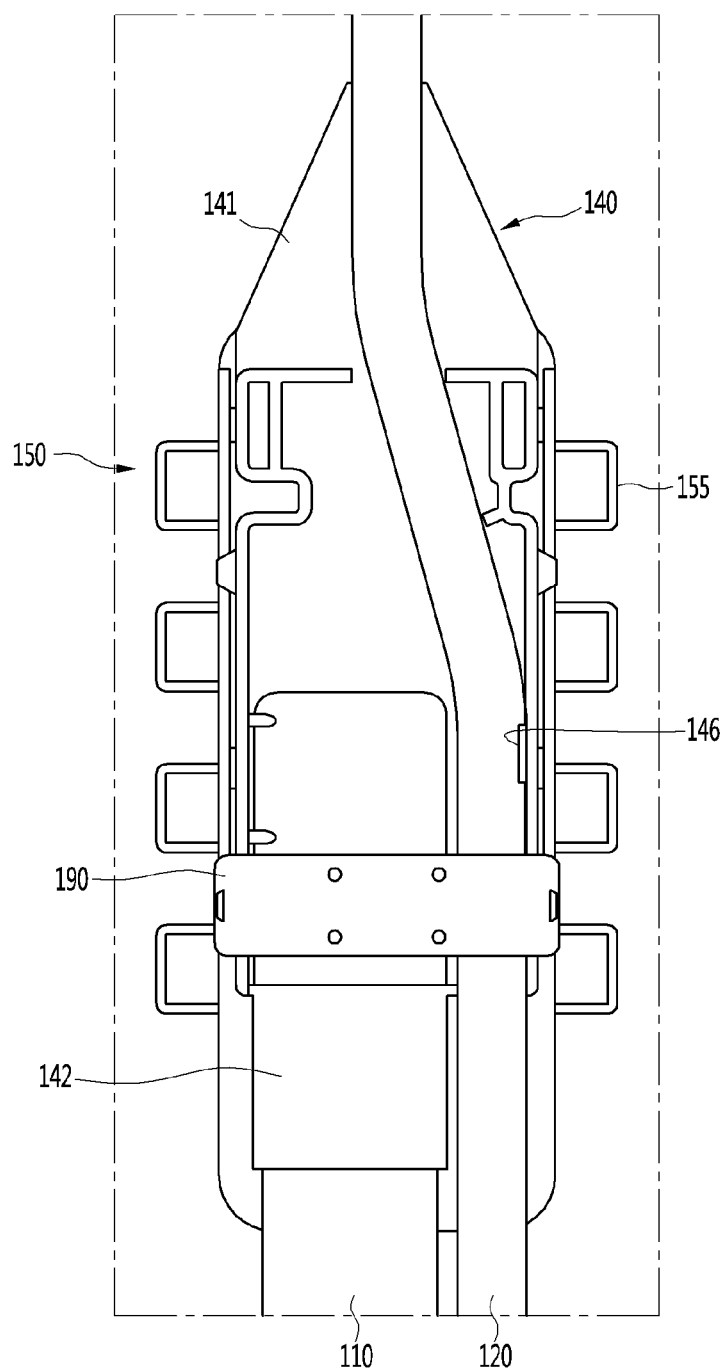
FIG. 6 is a rear view showing an upper pipe and a top pipe coupled to an upper connector and a holder according to an embodiment of the present invention.
Figure 7:
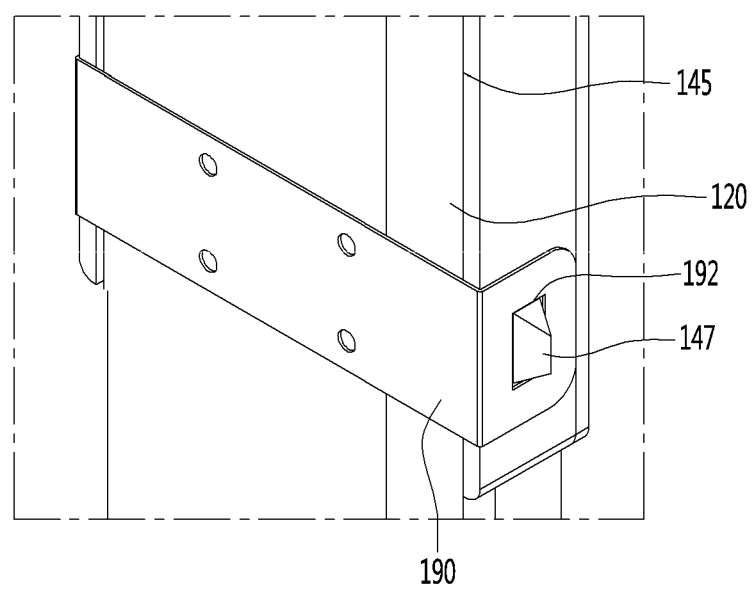
FIG. 7 is a view showing the bracket coupled to the upper connector according to an embodiment of the present invention.
Figure 8:
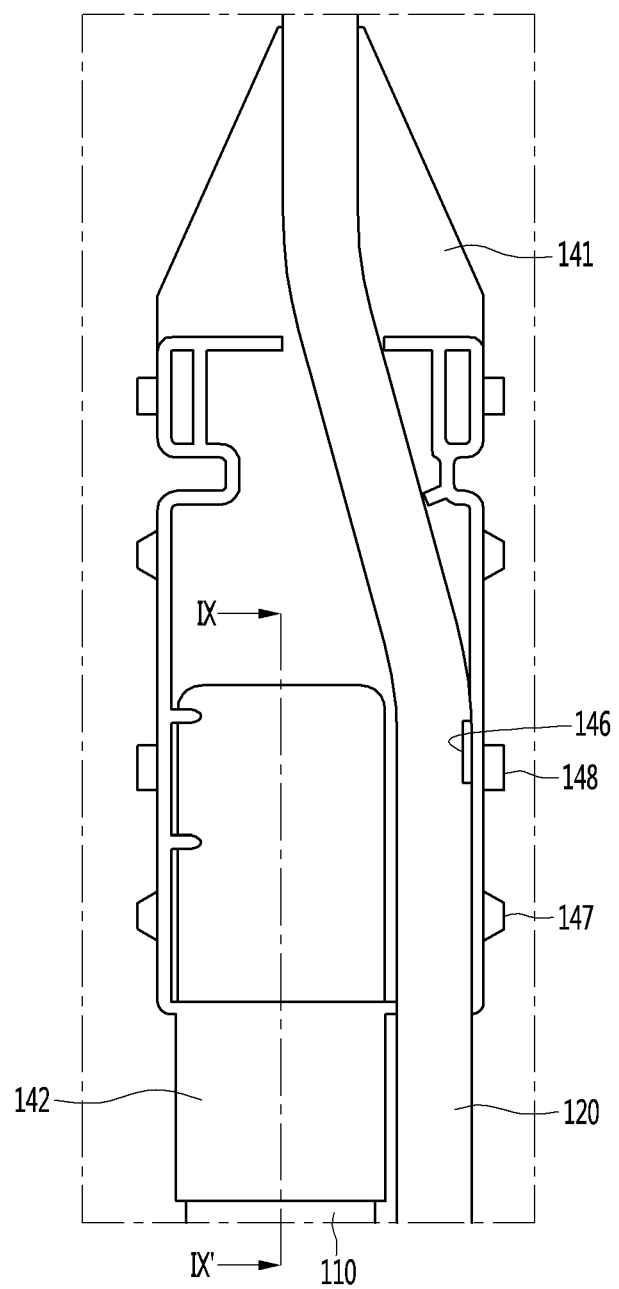
FIG. 8 is a rear view showing the upper pipe and the top pipe coupled to the upper connector according to an embodiment of the present invention.
Figure 9:
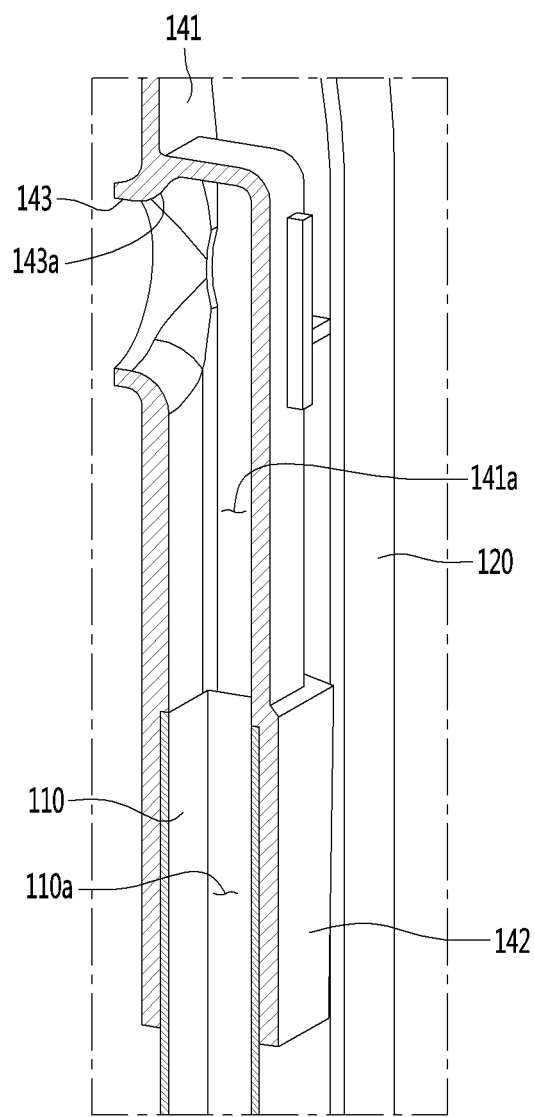
FIG. 9 is a cross-sectional view taken along line IX-IX' of FIG. 8.

FIG. 6 is a rear view showing the upper pipe and the top pipe coupled to the upper connector and the holder according to an embodiment of the present invention, FIG. 7 is a view showing the bracket coupled to the upper connector according to an embodiment of the present invention, FIG. 8 is a rear view showing the upper pipe and the top pipe coupled to the upper connector according to an embodiment of the present invention, and FIG. 9 is a cross-sectional view taken along line IX-IX' of FIG. 8.

Referring to FIGS. 6 to 9, the upper pipe 110 and the top pipe 120 according to an embodiment of the present invention are coupled to the upper connector 140. The upper connector 140 may be made of plastic. For example, the upper connector 140 may be made of PP (Polypropylene).

In detail, the connector body 141 of the upper connector 140 includes a pipe coupling portion 142 to which the upper pipe 110 is coupled. The upper pipe 110 is inserted in the pipe coupling portion 142 and the pipe coupling portion 142 may have a polygonal pocket shape to be able to receive the upper pipe 110. For example, the upper pipe 110 may be inserted from the lower end of the pipe coupling portion 142 and then may extend upward.

A connector channel 141a through which washing water flows is formed in the connector body 141. The connector channel 141a can guide washing water discharged from the upper pipe 110 to the connector outlet 143. That is, the connector channel 141a may extend to the connector outlet 143 from the outlet of the upper outlet 112 of the upper pipe 110.

Water discharged upward from the upper pipe 110 can flow forward toward the connector outlet 143 through the connector channel 141a. That is, the flow direction of washing water is changed in the connector channel 141a, so a round portion 143a may be formed on the inner side of the connector outlet 143 to reduce flow resistance. The round portion 143a is formed such that the inner side of the connector body 141 can be smoothly bent in the front-rear direction from the up-down direction. In order to achieve the round portion 143a, the upper connector 140 may be manufactured by double injection molding.

The upper pipe 110 may be forcibly fitted in the pipe coupling portion 142. Water discharged from the upper channel of the upper pipe 110 flows into the connector channel 141a of the upper connector 140. In this process, there is a possibility of leakage of washing water. Accordingly, the upper pipe 110 is brought in close contact with the pipe coupling portion 142 by forcible fitting, so leakage of washing water at the joint between the upper pipe 110 and the upper connector 140 can be prevented.

The connector body 141 of the upper connector 140 includes a pipe inserting portion 145 in which the top pipe 120 is inserted. The pipe inserting portion 145 is recessed forward from the rear side of the connector body 141 and vertically extends to correspond to the extension direction of the top pipe 120.

The water guide 100 further includes the bracket 190 coupled to the rear side of the top pipe 120 and supporting the top pipe 120. The bracket 190 may have a bent shape to surround at least a portion of the rear side and at least a portion of the lateral sides of the connector body 141. For example, the bracket 190 may include a bracket rear side surrounding at least a portion of the rear side of the connector body 141 and two bracket lateral sides surrounding at least a portion of both lateral sides of the connector body 141.

The bracket 190 includes a hook insert 192 fitted to a hook 147 of the connector body 141. The hook insert 192 is formed through at least a portion of the two bracket lateral sides and the hook 147 can be inserted in the hook insert 192. The hook 147 protrudes from both lateral sides of the connector body 141.

The upper connector 141 further includes a pipe supporting portion 146 for supporting the top pipe 120. The pipe supporting portion 146 may protrude from the rear side of the connector body 141 toward the pipe inserting portion 145 to support the rear side of the top pipe 120.

The upper connector 141 further includes pipe coupling portions 148 coupled to the holder 150. The holder coupling portions 148 may protrude outward from the lateral sides of the connector body 141 to be coupled to the holder 150. For example, the holding coupling portions 148 may include protrusions and the protrusions may be inserted in the holder 150.

Figure 10:
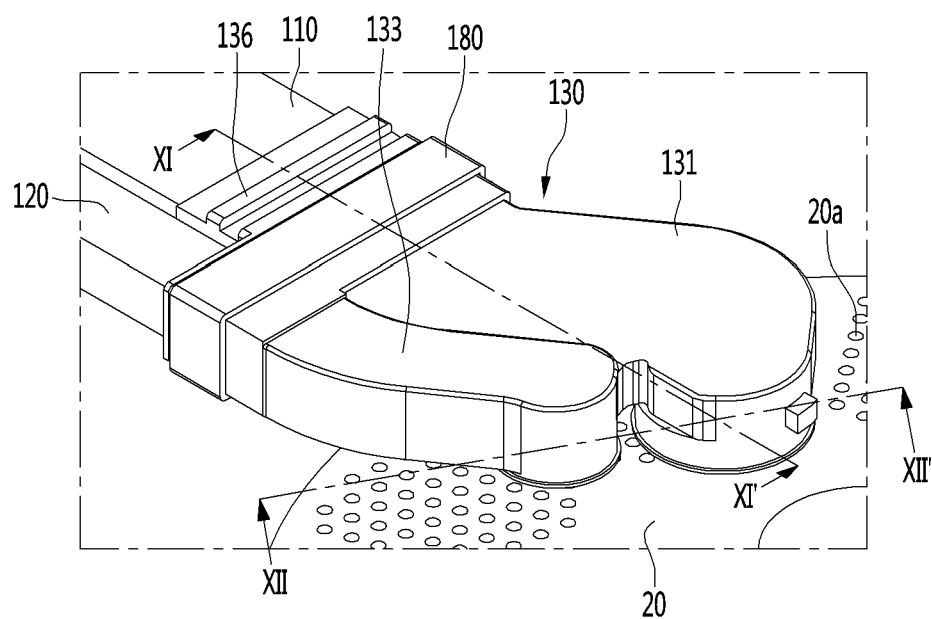
FIG. 10 is a view showing the upper pipe and the top pipe connected to the sump through the lower connector according to an embodiment of the present invention.
Figure 11:
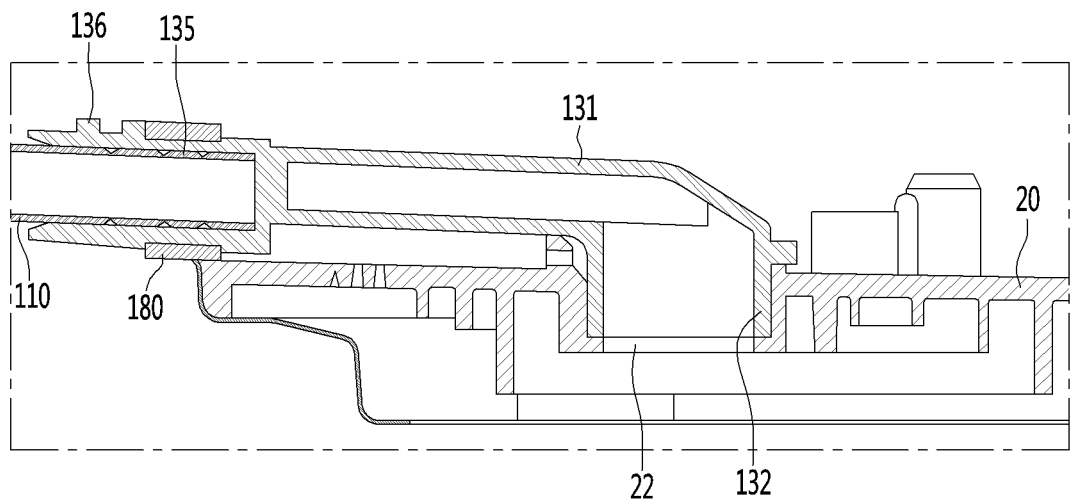
FIG. 11 is a cross-sectional view taken along line XI-XI' of FIG. 10.
Figure 12:
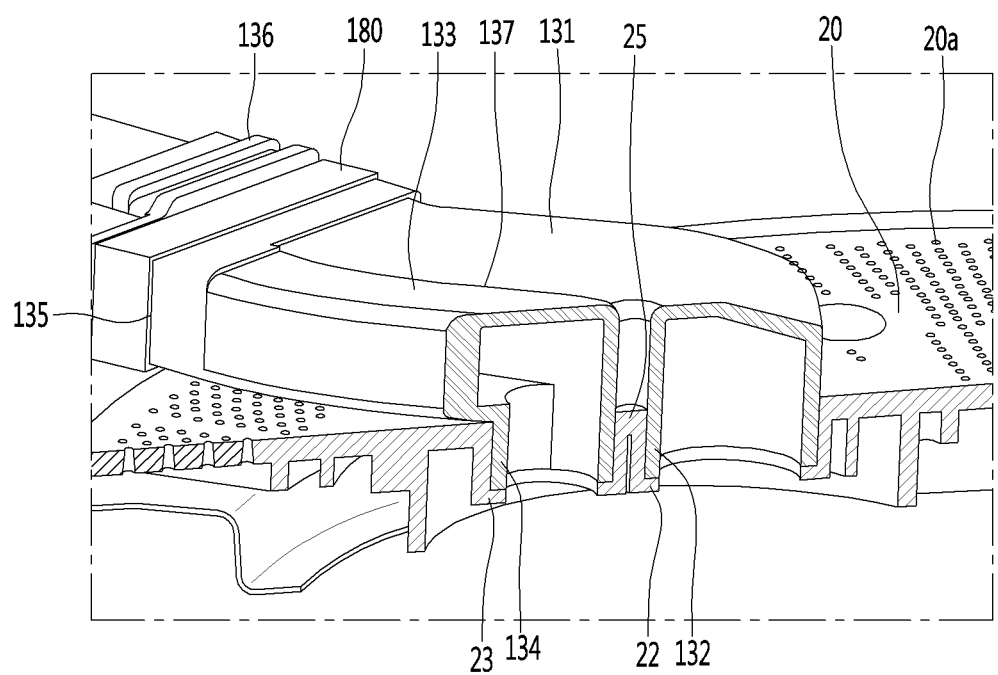
FIG. 12 is a cross-sectional view taken along line XII-XII' of FIG. 10.
Figure 13:
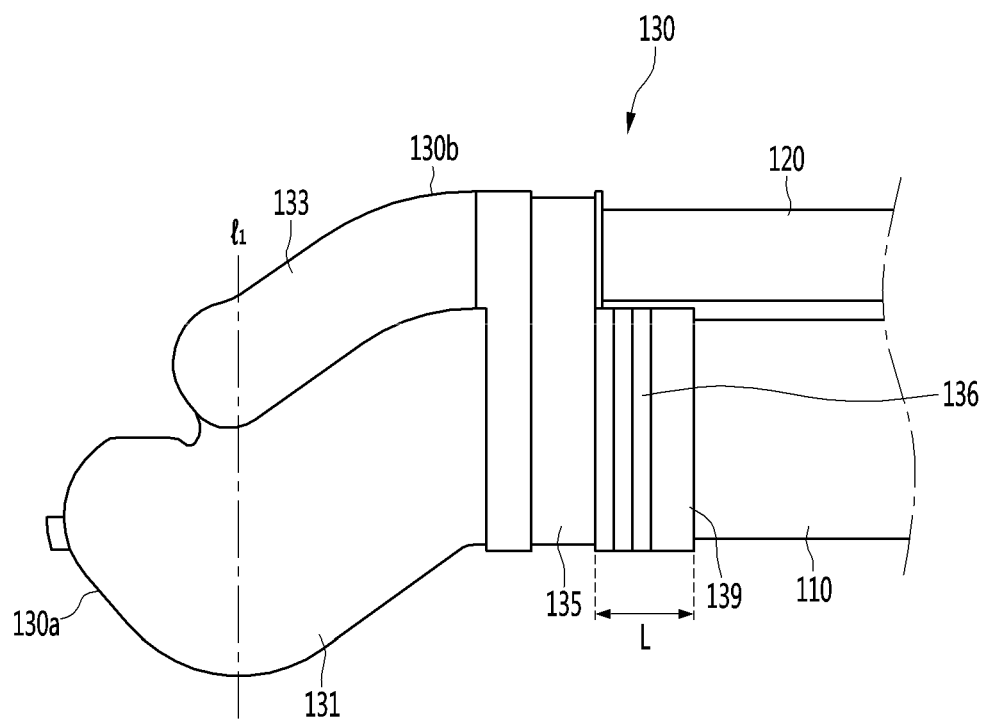
FIG. 13 is a plan view showing the upper pipe and the top pipe coupled to the lower connector according to an embodiment of the present invention.

FIG. 10 is a view showing the upper pipe and the top pipe connected to the sump through the lower connector according to an embodiment of the present invention, FIG. 11 is a cross-sectional view taken along line XI-XI' of FIG. 10, FIG. 12 is a cross-sectional view taken along line XII-XII' of FIG. 10, and FIG. 13 is a plan view showing the upper pipe and the top pipe coupled to the lower connector according to an embodiment of the present invention.

Referring to FIGS. 10 and 12 first, the upper pipe 110 and the top pipe 120 according to an embodiment of the present invention may be coupled to the sump 20 through the lower connector 130.

The sump 20 includes sump inlets 20a on the top thereof through which washing water flows into the sump 20. The lower connector 130 may be coupled to the top of the sump 20a, and the upper pipe 110 and the top pipe 120 may be coupled to the lower connector 130.

The lower connector 130 includes an upper pipe connecting portion 131 connected with the upper pipe 110 and a top pipe connecting portion 133 connected with the top pipe 120. For the convenience of description, the upper pipe connecting portion 131 may be referred to as a "first connecting portion" and the top pipe connecting portion 133 may be referred to as a "second connecting portion".

The upper pipe connecting portion 131 and the top pipe connecting portion 133 may be integrally formed by injection molding. The lower connector 130 includes a separation wall 137 that separates the upper pipe connecting portion 131 and the top pipe connecting portion 133. The separation wall 137 may be disposed between the upper pipe connecting portion 131 and the top pipe connecting portion 133. A washing water channel in the upper pipe connecting portion 131 and a washing water channel in the top pipe connecting portion 133 can be separated by the separation wall 137.

In detail, a first channel that guides washing water to the upper pipe 110 is formed in the upper pipe connecting portion 131 and a second channel that guides washing water to the top pipe 120 is formed in the top pipe connecting portion 133. The first and second channels can be separated from each other by the separation wall 137.

The first channel of the upper pipe connecting portion 131 may be formed greater than the second channel of the top pipe connecting portion 133. The size of the upper pipe connecting portion 131 may be greater than the size of the top pipe connecting portion 133.

The upper pipe 110 is coupled to the rear portion of the upper pipe connecting portion 131. For example, the upper pipe 110 may be inserted in the rear portion of the upper pipe connecting portion 131. The top pipe 120 is coupled to the rear portion of the top pipe connecting portion 133. For example, the top pipe 120 may be inserted in the rear portion of the top pipe connecting portion 133.

The front portion of the upper pipe connecting portion 131 is coupled to the top of the sump 20. The sump 20 includes a first outlet 22 for discharging the washing water stored in the sump 20 from the sump 20. The first outlet 22 is recessed down from the top of the sump 20 and may communicate with a washing water storage space in the sump 20.

The upper pipe connecting portion 131 includes a first sump coupling portion 132 coupled to the first outlet 22. The first sump coupling portion 132 may vertically extend at the front portion of the upper pipe connecting portion 131 and may extend into the first outlet 22 from above the first outlet 22. Accordingly, the washing water stored in the sump 20 can flow into the upper pipe connecting portion 131 through the first outlet 22 and the first sump coupling portion 132.

The front portion of the top pipe connecting portion 133 is coupled to the top of the sump 20. The sump 20 includes a second outlet 23 for discharging the washing water stored in the sump 20 from the sump 20. The second outlet 23 may be formed at a predetermined distance from the first outlet 22. The second outlet 23 is recessed down from the top of the sump 20 and may communicate with a washing water storage space in the sump 20.

The top pipe connecting portion 133 includes a second sump coupling portion 134 coupled to the second outlet 23. The second sump coupling portion 134 may vertically extend at the front portion of the top pipe connecting portion 133 and may extend into the second outlet 23 from above the second outlet 23. Accordingly, the washing water stored in the sump 20 can flow into the top pipe connecting portion 133 through the second outlet 23 and the second sump coupling portion 134.

The sump 20 further includes a channel separator 25 that separates the first outlet 22 and the second outlet 23. The channel separator 25 may be disposed between the first outlet 22 and the second outlet 23. Washing water stored in the sump 20 can be divided and discharged through the first outlet 22 and the second outlet 23 by the channel separator 25.

The water guide 100 further includes the clamp 180 coupled to the lower connector 130 and keeping the upper pipe 110 and the top pipe 120 in close contact with the lower connector 130.

The clamp 180 may be coupled to the rear portion of the lower connector 130. In detail, the clamp 180 may be disposed to surround the portion in which the upper pipe 110 and the top pipe 120 are inserted of the rear portion of the lower connector 130, that is, the outer side of a clamp coupling portion 135.

The clamp 180 may be disposed in contact with the clamp coupling portion 135. At least a portion of the clamp coupling portion 135 may constitute the upper pipe connecting portion 131 and the other portion may constitute the top pipe connecting portion 133.

Referring to FIG. 13, the lower connector 130 may be made of rubber. For example, the lower connector 130 may be made of an EPDM material (EPDM rubber or ethylene propylene diene M-class rubber)

The lower connector 130 may have portions having different hardness by multiple injection molding. The lower connector 130 includes a connector-front portion 130a including the portion coupled to the sump 20 and a connector-rear portion 130b including the portion coupled to the top pipe 120.

The connector-front portion 130a and the connector-rear portion 130b can be separated by a first extension line That is, the connector-front portion 130a is a portion defined ahead of the first extension line $l_1$ and the connector-rear portion 130b is a portion defined behind the first extension line $l_1$. At least a portion of the connector-front portion 130a may constitute the upper pipe connecting portion 131 and the other portion may constitute the top pipe connecting portion 133.

The hardness of the connector-front portion 130a may be higher than the hardness of the connector-rear portion 130b.

In detail, the connector-front portion 130a may have relatively high hardness to be stably coupled to the sump 20. For example, the hardness of the connector-front portion 130a may be 90 in shore hardness. Since the connector-front portion 130a has high hardness, it is possible to prevent the lower connector 130 from separating from the sump 20.

The connector-rear portion 130b may have relatively low hardness to prevent leakage of washing water. For example, the hardness of the connector-rear portion 130b may be 60 in shore hardness. Since the connector-rear portion 130b has low hardness, the lower connector 130 can be brought in closer contact with the upper pipe 110 and the top pipe 120, so leakage of washing water at the joint between the lower connector 130 and the pipes 110 and 120 can be prevented.

The connector-rear portion 130b includes the clamp coupling portion 135 to which the clamp 180 is coupled and a connector extending portion 139 extending rearward from the clamp coupling portion 135. The connector extending portion 139 constitute the upper pipe connecting portion 131.

That is, the length of the rear portion of the upper pipe connecting portion 131 may be greater than that of the rear portion of the top pipe connecting portion 133 by the front-rear length L1 of the connecting extending portion 139. This is for more strongly sealing the joint between the upper pipe 110 and the upper pipe connecting portion 131 because more washing water flows through the upper pipe connecting portion 131 than the top pipe connecting portion 133.

Accordingly, the contact area between the upper pipe 110 and the upper pipe connecting portion 131 may be greater than the contact area between the top pipe 120 and the top pipe connecting portion 133 by the connector extending portion 139.

The connector extending portion 139 has a protrusion 136. The protrusion 136 is formed on the outer surface of the connector extending portion 139. The protrusion 136 can reduce the amount of deformation of the upper pipe connecting portion 131 when the upper pipe connecting portion 131 is deformed by the pressure of the washing water flowing through the upper pipe 110. That is, the elasticity of the upper pipe connecting portion 131 can be increased and the strength of the upper pipe connecting portion 131 can be correspondingly improved by the protrusion 136. A plurality of protrusions 136 may be provided and they may be spaced apart from one another in the front-rear direction.

Figure 14:
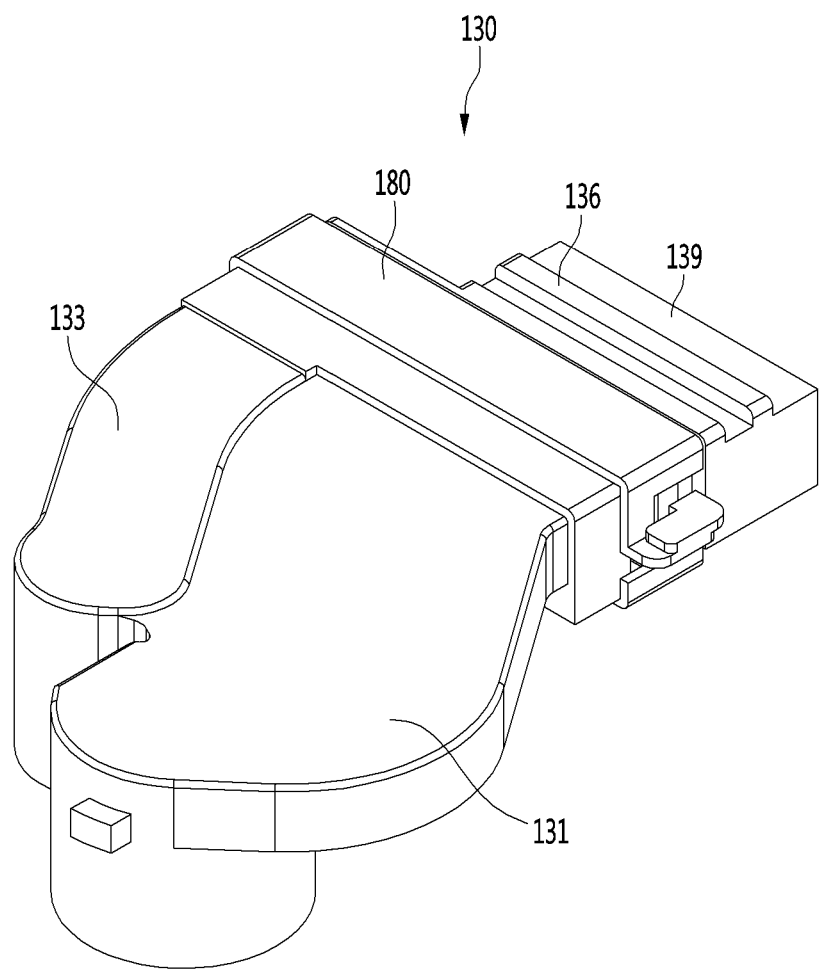
FIG. 14 is a perspective view showing the clamp coupled to the lower connector according to an embodiment of the present invention.
Figure 15A:
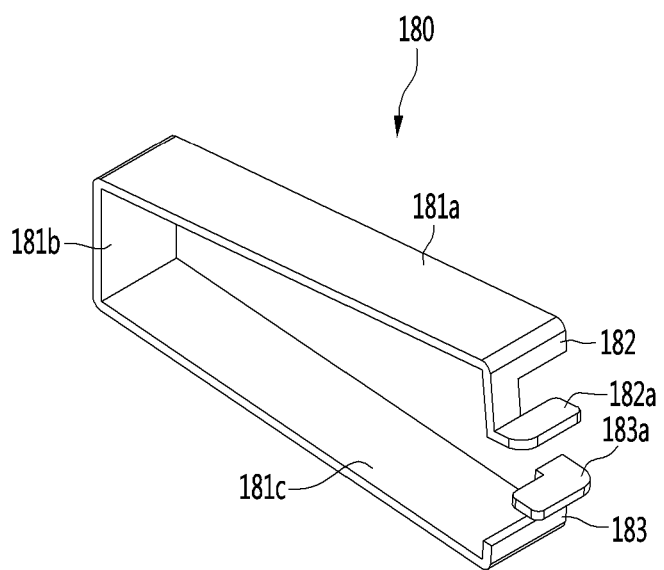
FIGS. 15A and 15B are views showing the configuration of the clamp according to an embodiment of the present invention.
Figure 15B:
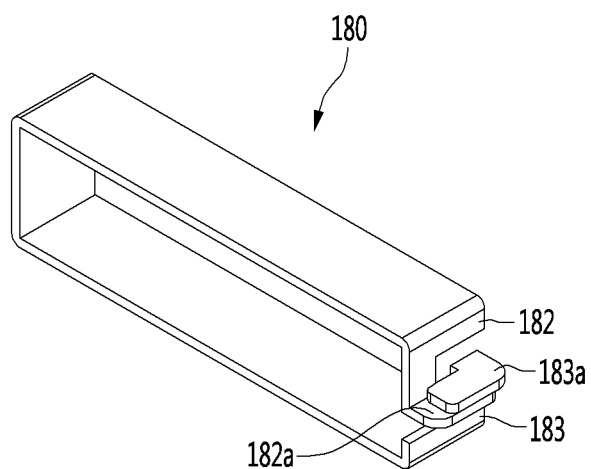

FIG. 14 is a perspective view showing the clamp coupled to the lower connector according to an embodiment of the present invention and FIGS. 15A and 15B are views showing the configuration of the clamp according to an embodiment of the present invention.

Referring to FIGS. 14 to 15B, the clamp 180 is coupled to the lower connector 130 according to an embodiment of the present invention. The clamp 180 may be made of a plate-shaped elastic material. For example, the clamp 180 may include a plate-shaped spring.

The clamp 180 may be formed relatively thin to prevent interference by the lower nozzle 17. For example, the thickness of the clamp 180 may be in the range of 0.4~0.6 mm.

The clamp 180 may have a bent shape. In detail, the clamp 180 includes a first part 181a that is placed on the top of the lower connector 130, a second part 181b that bends downward from a side of the first part 181a and is placed on a lateral side of the lower connector 130, and a third part 181c that bends from the second part 181b and is placed on the bottom of the lower connector 130.

The clamp 180 further includes a first locking portion 182 bending downward from the other side of the first part 181a and a second locking portion 183 bending upward from the third part 181c to be locked to the first locking portion 182.

When the clamp 180 is not coupled yet to the lower connector 130, the first and second locking portions 182 and 183 may be spaced apart from each other without locking to each other. That is, the first locking portion 182 may be spaced upward apart from the second locking portion 183.

When the first locking portion 182 and the second locking portion 183 are closed with the clamp 180 fitted on the lower connector 130, the first locking portion 182 and the second locking portion 183 can be locked to each other.

The first locking portion 182 may include a first protrusion 182a and the second locking portion 183 may include a second protrusion 183a. The first protrusion 182a and the second protrusion 183a may protrude laterally from lateral sides of the first and second locking portions 182 and 183. The first protrusion 182a may be locked to the second locking portion 183a under the second locking portion 183a. That is, the top of the first locking portion 182a may be supported by the bottom of the second locking portion 183a.

According to this configuration, the clamp 180 can be easily coupled to and separated from the lower connector 130 and the tightening force of the clamp 180 can be easily transmitted to the upper pipe 110 and the top pipe 120 through the lower connector 130.

Figure 16:
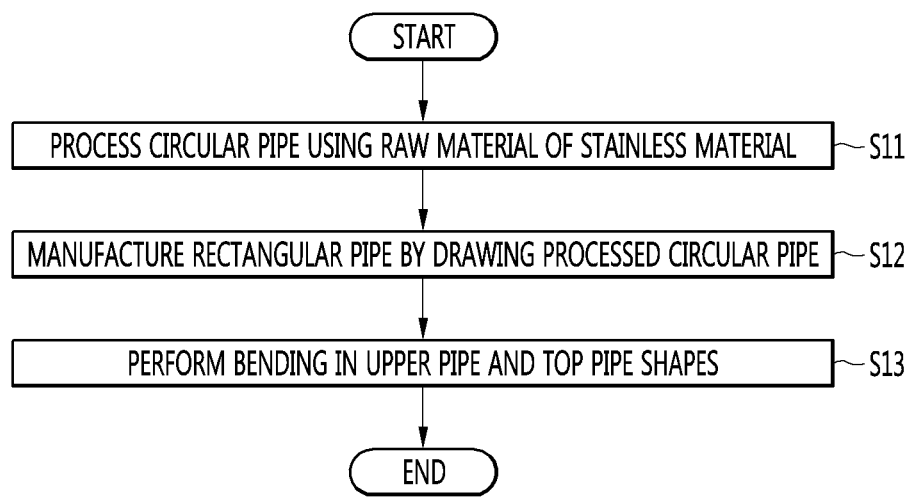
FIG. 16 is a flowchart showing a method of manufacturing a pipe according to an embodiment of the present invention.

FIG. 16 is a flowchart showing a method of manufacturing a pipe according to an embodiment of the present invention. A method of manufacturing the upper pipe 110 or the top pipe 120 according to an embodiment of the present invention is described with reference to FIG. 16.

First, it is possible to manufacture a circular pipe using a stainless material that is a raw material. The stainless material may include ductile stainless steel described above, In detail, a plate made of a stainless material that is a raw material is rolled and both bonding ends of the rolled plate can be bonded by gas welding. The bonding portions are cooled and polished, and then a circular pipe is taken out. The taken circular pipe is cut in an appropriate size (S11).

A polygonal pipe, for example, a rectangular pipe is obtained by performing drawing on the processed circular pipe and is then cut in an appropriate size. The rectangular pipe may be manufactured to have inner/outer sizes corresponding to the upper pipe 110 and the top pipe 120.

The upper pipe 110 and the top pipe 120 for the water guide according to the present invention can be manufactured by performing bending on the manufactured rectangular pipe. Bending can be performed by a polygonal mandrel.

Since bending of a pipe is performed using ductile stainless steel, as described above, elongation and processibility of a pipe can be improved. Accordingly, the first and second bending portions 115 and 125 of the pipes 110 and 120 can be easily achieved and stress corrosion at the first and second bending portions 115 and 125 can be reduced, so damage to the pipes 110 and 120 can be prevented (S13).

Figure 17:
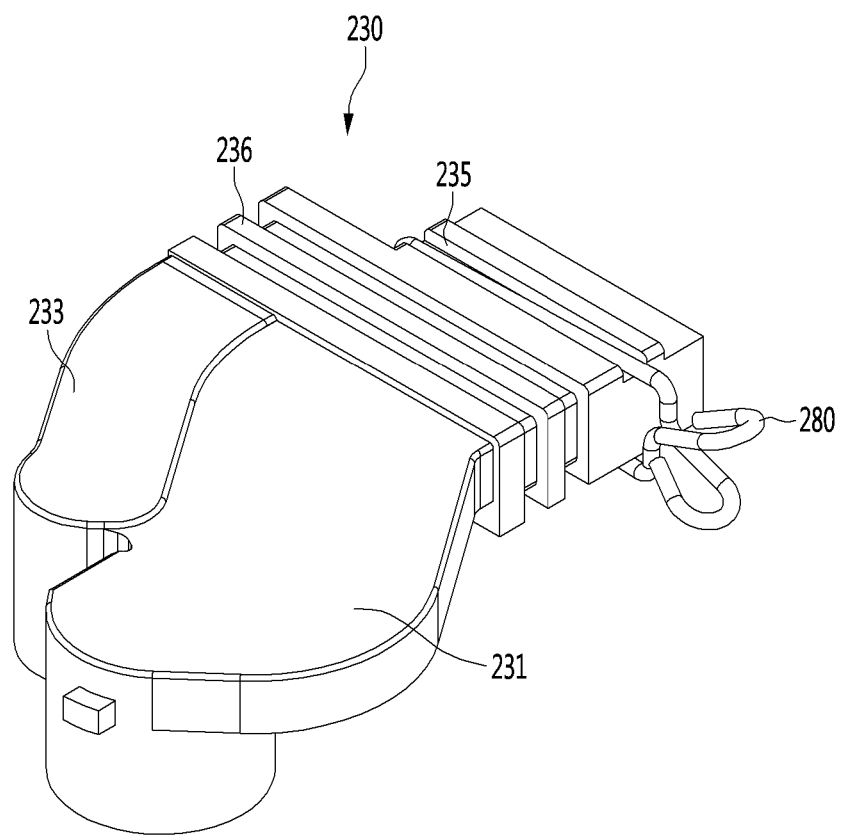
FIG. 17 is a perspective view showing a clamp coupled to the lower connector according to another embodiment of the present invention.
Figure 18:
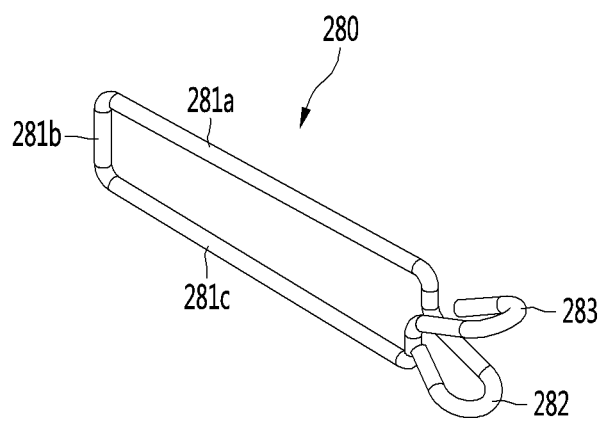
FIG. 18 is a view showing the configuration of the clamp of FIG. 17.

FIG. 17 is a perspective view showing a clamp coupled to a lower connector according to another embodiment of the present invention and FIG. 18 is a view showing the configuration of the clamp of FIG. 17.

Referring to FIGS. 17 and 18, a clamp 280 is coupled to a lower connector 230 according to another embodiment of the present invention. The clamp 280 may be made of an elastic material. For example, the clamp 280 may include a spring wire.

The clamp 280 may be formed relatively thin to prevent interference by the lower nozzle 17. For example, the thickness of the clamp 20 may be in the range of 0.4~0.6 mm.

The lower connector 230 includes an upper pipe connecting portion 231 to which the upper pipe 110 is coupled and a top pipe connecting portion 233 to which the top pipe 120 is coupled. The upper pipe connecting portion 231 and the top pipe connecting portion 233 form separate washing water channels.

A protrusion 236 for increasing elasticity of the upper pipe connecting portion 231 and the top pipe connecting portion 233 may be formed at the rear portion of the upper pipe connecting portion 231 and the rear portion of the top pipe connecting portion 233. The protrusion 236 protrudes from the upper pipe connecting portion 231 and the top pipe connecting portion 233 and a plurality of protrusions may be provided.

The upper pipe connecting portion 231 has a clamp coupling portion 235 to which the clamp 280 is coupled. The clamp coupling portion 235 may include grooves formed between the plurality of protrusions 236 on the upper pipe connecting portion 231. The clamp 280 may be coupled to the outer surface of the upper pipe connecting portion 231 by being inserted in the grooves. By this configuration, the clamp 280 can firmly fix the upper pipe 110 coupled to the upper pipe connecting portion 231.

The clamp 280 may have a bent shape. In detail, the clamp 280 includes a first part 281a that is placed on the top of the lower connector 230, a second part 281b that bends downward from a side of the first part 281a and is placed on a lateral side of the lower connector 230, and a third part 281c that bends from the second part 281b and is placed on the bottom of the lower connector 230.

The clamp 280 further includes a first locking portion 282 bending downward from the other side of the first part 281a and a second locking portion 283 bending upward from the third part 281c to be locked to the first locking portion 282.

When the clamp 280 is coupled to the lower connector 230, the first and second locking portions 282 and 283 can be opened away from each other, so the clamp 280 can be fitted to the clamp coupling portion 235.

When the clamp 280 is fitted to the lower connector 230, the first locking portion 282 and the second locking portion 283 can be locked to each other by returning force.

According to this configuration, the clamp 280 can be easily coupled to and separated from the lower connector 230 and the tightening force of the clamp 280 can be easily transmitted to the upper pipe 110 through the lower connector 230.

Figure 19:
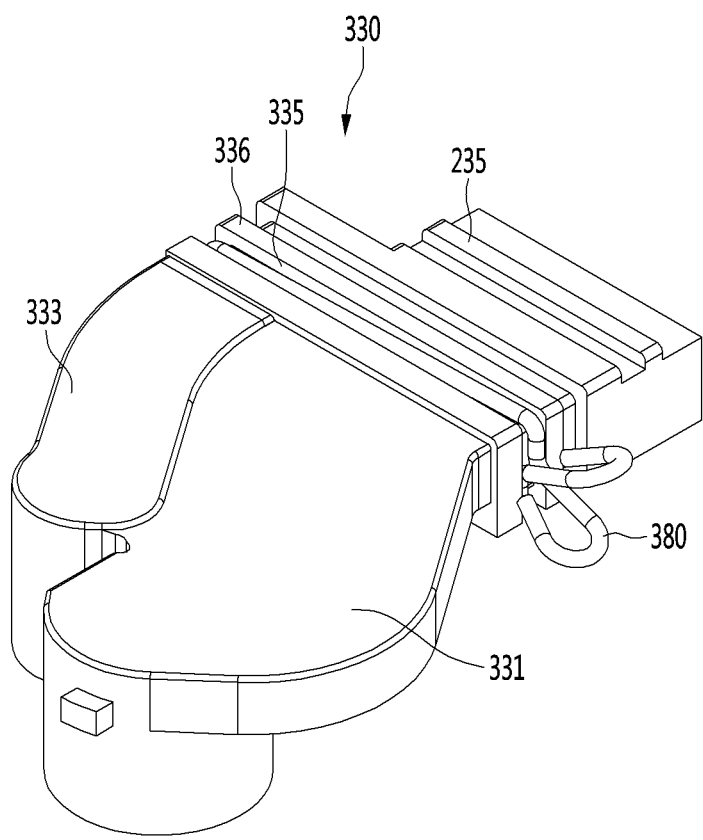
FIG. 19 is a perspective view showing a clamp coupled to a lower connector according to another embodiment of the present invention.

FIG. 19 is a perspective view showing a clamp coupled to a lower connector according to another embodiment of the present invention.

Referring to FIG. 19, a clamp 380 is coupled to a lower connector 330 according to another embodiment of the present invention. The clamp 380 may be made of an elastic material. For example, the clamp 380 includes a spring wire and may have the same configuration as the clamp described with reference to FIG. 18.

The lower connector 330 includes an upper pipe connecting portion 331 to which the upper pipe 110 is coupled and a top pipe connecting portion 333 to which the top pipe 120 is coupled. The upper pipe connecting portion 331 and the top pipe connecting portion 333 form separate washing water channels.

A protrusion 336 for increasing elasticity of the upper pipe connecting portion 331 and the top pipe connecting portion 333 may be formed at the rear portion of the upper pipe connecting portion 331 and the rear portion of the top pipe connecting portion 333. The protrusion 236 protrudes from the upper pipe connecting portion 331 and the top pipe connecting portion 333 and a plurality of protrusions may be provided.

The upper pipe connecting portion 331 and the top pipe connecting portion 333 have a clamp coupling portion 335 to which the clamp 380 is coupled. The clamp coupling portion 335 may include grooves formed between the plurality of protrusions 236 on the upper pipe connecting portion 331 and the top pipe connecting portion 333.

The clamp 380 may be coupled to the outer surfaces of the upper pipe connecting portion 331 and the top pipe connecting portion 333 by being inserted in the grooves. By this configuration, the clamp 380 can firmly fix the upper pipe 110 coupled to the upper pipe connecting portion 331 and the top pipe 120 coupled to the top pipe connecting portion 333.

According to this configuration, the clamp 380 can be easily coupled to and separated from the lower connector 330 and the tightening force of the clamp 380 can be easily transmitted to the upper pipe 110 and the top pipe 120 through the lower connector 330.

What is claimed is:

1. A dishwasher comprising:
 a washing container configured to receive one or more objects to be washed;
 a sump disposed at a lower portion of the washing container and configured to store washing water;
 an upper nozzle disposed at a center portion of the washing container and configured to spray washing water supplied from the sump to the washing container;
 a top nozzle that is disposed at an upper portion of the washing container, that is positioned vertically above the upper nozzle, and that is configured to spray washing water supplied from the sump to the washing container; and
 a water guide that extends upward from the sump and that is configured to supply washing water to the upper nozzle and to the top nozzle, the water guide comprising:
  an upper pipe having an upper inlet configured to receive washing water from a first outlet of the sump, and an upper outlet configured to supply washing water to the upper nozzle,
  a top pipe that is separately disposed at a side of the upper pipe and that is configured to receive washing water from a second outlet of the sump to supply washing water to the top nozzle, and
  an upper connector that supports the upper pipe and the top pipe, the upper connector including a connector body that is coupled to the upper pipe,
 wherein the connector body defines:
  a connector channel configured to guide washing water discharged through the upper outlet of the upper pipe,
  a connector outlet configured to discharge washing water guided through the connector channel,
  a pipe coupling portion that receives the upper outlet of the upper pipe and that is configured to supply washing water discharged from the upper outlet toward the connector outlet through the connector channel, and
  a pipe inserting portion that receives the top pipe,
 wherein the upper pipe is fitted into the pipe coupling portion such that the upper outlet and the connector channel are in communication with each other,
 wherein the upper connector further includes a pipe supporting portion that protrudes from a rear side of the connector body toward the pipe inserting portion, the pipe supporting portion supporting a rear side of the top pipe,
 wherein the connector body comprises hooks that protrude from lateral sides of the connector body, respectively,
 wherein the dishwasher further comprises a bracket that is coupled to the upper connector and supports the rear side of the top pipe, the bracket comprising:
  a bracket rear side that covers at least a portion of the rear side of the connector body and the rear side of the top pipe,
  bracket lateral sides that cover at least a portion of the lateral sides of the connector body, respectively, and
  hook inserts that are defined at the bracket lateral sides, respectively, each of the hook inserts receiving one of the hooks of the connector body,
 wherein an inner surface of the pipe coupling portion defines a recess that is stepped relative to an inner surface of the connector body and that receives an upper portion of the upper pipe,
 wherein a distal end of the upper pipe is in contact with an upper end of the recess and configured to block leakage of washing water, the upper end of the recess being disposed vertically below the connector outlet, and
 wherein a depth of the recess is equal to a thickness of the upper pipe such that the inner surface of the connector body is coplanar with an inner surface of the upper portion of the upper pipe to thereby minimize a flow resistance of washing water flowing along the upper pipe and the upper connector.

2. The dishwasher of claim 1, wherein the upper outlet is disposed inside the pipe coupling portion.

3. The dishwasher of claim 1, wherein the bracket has a bent shape that surrounds at least a portion of a rear side of the upper connector and at least a portion of both lateral sides of the upper connector.

4. The dishwasher of claim 1, wherein the connector outlet is disposed at a front surface of the connector body, and has a round shape that extends from the connector channel.

5. The dishwasher of claim 4, further comprising:
 a holder coupled to the upper connector, the holder comprising a pipe communicating portion that is in communication with the connector outlet; and a supply pipe that is coupled to the pipe communicating portion and that extends toward the upper nozzle.

6. The dishwasher of claim 1, wherein the top pipe comprises a top pipe inlet configured to receive washing water from the second outlet of the sump, and a top pipe outlet configured to discharge washing water from the top pipe, and wherein the dishwasher further comprises a top connector that allows communication between the top pipe outlet and the top nozzle.

7. The dishwasher of claim 1, wherein at least one of the upper pipe or the top pipe is made of a stainless material.

8. The dishwasher of claim 1, wherein at least one of the upper pipe or the top pipe is a stainless steel pipe made of a stainless material and impurities including carbon, manganese, chromium, nickel, and copper.

9. The dishwasher of claim 1, further comprising:

an upper pipe bending portion disposed at the upper pipe and configured to change a first flow direction of washing water in the upper pipe; and a first top pipe bending portion and a second top pipe bending portion that are disposed at the top pipe, each of the first and second top pipe bending portions being configured to change a second flow direction of washing water in the top pipe.

10. The dishwasher of claim 1, wherein at least one of the upper pipe or the top pipe has a polygonal shape.

11. The dishwasher of claim 1, wherein a channel cross-sectional area of the upper pipe is greater than a channel cross-sectional area of the top pipe.

12. The dishwasher of claim 1, wherein the upper pipe extends together with the top pipe to the upper connector, and the upper pipe is configured to discharge washing water to the connector channel in the upper connector, and wherein the top pipe passes through the upper connector to connect to the top nozzle.

13. The dishwasher of claim 1, wherein the connector outlet is positioned vertically above the upper outlet of the upper pipe located inside the upper connector.

14. The dishwasher of claim 1, wherein the pipe inserting portion is recessed forward relative to the rear side of the connector body and vertically extends along an extension direction of the top pipe.

15. The dishwasher of claim 14, wherein the connector body covers at least a portion of a front side of each of the upper pipe and the top pipe.

16. The dishwasher of claim 1, wherein the distal end of the upper pipe is received inside the connector body and defines the upper outlet in an upward direction facing the top pipe.

* * * * *